United States Patent
Goetsch et al.

(10) Patent No.: US 10,632,787 B1
(45) Date of Patent: Apr. 28, 2020

(54) WHEEL DOLLY

(71) Applicants: Daniel B Goetsch, Upland, CA (US); Clint Griffith, Lucerne Valley, CA (US)

(72) Inventors: Daniel B Goetsch, Upland, CA (US); Clint Griffith, Lucerne Valley, CA (US)

(*) Notice: Subject to any disclaimer, the term of this patent is extended or adjusted under 35 U.S.C. 154(b) by 0 days.

(21) Appl. No.: 16/407,804

(22) Filed: May 9, 2019

Related U.S. Application Data

(63) Continuation of application No. 29/690,190, filed on May 6, 2019.

(60) Provisional application No. 62/843,905, filed on May 6, 2019.

(51) Int. Cl.
| | | |
|---|---|---|
| B60B 29/00 | (2006.01) | |
| B60B 33/06 | (2006.01) | |
| B60B 33/00 | (2006.01) | |
| B62B 1/10 | (2006.01) | |
| B62B 5/00 | (2006.01) | |

(52) U.S. Cl.
CPC .......... B60B 33/066 (2013.01); B60B 29/002 (2013.01); B60B 33/0055 (2013.01); B62B 1/10 (2013.01); B62B 5/0083 (2013.01); *B62B 2202/031* (2013.01)

(58) Field of Classification Search
CPC ....... B60B 33/066; B60B 29/002; B62B 3/02; B62B 3/08; B62B 3/104; B62B 5/049; B62B 2202/031; B62B 2202/02; B62B 2203/20; B62B 2203/21
See application file for complete search history.

(56) References Cited

U.S. PATENT DOCUMENTS

| | | | | |
|---|---|---|---|---|
| 112,740 | A * | 3/1871 | Ryder | B60B 33/06 16/34 |
| 894,949 | A * | 8/1908 | Hendricks | B60B 33/06 16/32 |
| 1,014,992 | A * | 1/1912 | Ames | B66F 5/04 254/8 B |
| 2,779,049 | A * | 1/1957 | Hoddevik | B60B 33/06 16/34 |
| 3,295,482 | A * | 1/1967 | Dountas | A01C 23/008 111/120 |
| 3,625,381 | A * | 12/1971 | Menzi | B60B 35/1027 414/694 |
| 3,685,125 | A * | 8/1972 | DePierre | B60B 29/002 29/252 |
| 4,664,398 | A * | 5/1987 | Mozer | B62B 3/04 280/43.11 |
| 4,690,605 | A * | 9/1987 | Coccaro | B60B 29/002 254/119 |

(Continued)

*Primary Examiner* — Emma K Frick
(74) *Attorney, Agent, or Firm* — Manuel de la Cerra

(57) ABSTRACT

A wheel dolly for raising a vehicle wheel off the floor is disclosed. The dolly has at least two wheel straddle bars, each straddle bar having a non-swing caster assembly. A swing caster assembly is connected to each straddle bar. The assembly includes a stationary frame supporting a swing axle, a swing frame that rotates about the swing axle, and a swing caster connected to swing frame. The swing caster defines a swivel plane. A lift bar connects the two wheel straddle bars. The dolly can transition between two configurations: a lowered configuration, wherein the swivel plane is not parallel to the floor, and a raised configuration, wherein the swivel plane is substantially parallel to the floor.

18 Claims, 14 Drawing Sheets

(56) References Cited

U.S. PATENT DOCUMENTS

| | | | | |
|---|---|---|---|---|
| 4,692,082 A * | 9/1987 | Smith | B66F 5/02 | 414/429 |
| 4,799,656 A * | 1/1989 | Puskarich | B66F 5/02 | 254/134 |
| 4,854,803 A * | 8/1989 | Coccaro | B60B 29/002 | 414/429 |
| 5,044,645 A * | 9/1991 | Eltvik | B60B 29/002 | 280/79.4 |
| 5,112,070 A * | 5/1992 | Hahn | B60B 29/002 | 280/79.4 |
| 5,253,389 A * | 10/1993 | Colin | B60B 33/06 | 16/30 |
| 5,465,985 A * | 11/1995 | Devan | A45C 5/146 | 280/30 |
| 5,575,036 A * | 11/1996 | May | B60B 33/06 | 16/32 |
| 5,628,522 A * | 5/1997 | Hall | B60B 33/06 | 280/43.14 |
| 5,732,960 A * | 3/1998 | Elam | B60B 29/002 | 254/113 |
| 6,179,542 B1 * | 1/2001 | Haven | B60B 29/002 | 280/43.2 |
| 6,789,994 B2 * | 9/2004 | Tortellier | B60B 29/002 | 414/426 |
| 6,863,489 B2 * | 3/2005 | Grubbs | B62B 5/0083 | 280/46 |
| 7,097,406 B1 * | 8/2006 | Gang | B60B 29/002 | 254/105 |
| 7,530,581 B1 * | 5/2009 | Squires, Sr. | B62B 3/04 | 280/47.35 |
| 8,657,306 B2 * | 2/2014 | Chiu | B23Q 1/015 | 280/43.1 |
| 8,910,957 B1 * | 12/2014 | Hassell | B60P 3/127 | 254/105 |
| 9,145,154 B1 * | 9/2015 | Horowitz | B62B 3/025 | |
| 9,358,995 B2 * | 6/2016 | Allos | B62B 3/008 | |
| 9,557,000 B2 * | 1/2017 | Chang | F16M 13/00 | |
| 9,573,420 B2 * | 2/2017 | Hedley | B66F 7/26 | |
| 10,105,988 B1 * | 10/2018 | Frankel | B60B 33/066 | |
| 10,279,827 B1 | 5/2019 | Mason | | |
| 2003/0137130 A1 * | 7/2003 | Chang | A47D 9/00 | 280/641 |
| 2006/0103092 A1 * | 5/2006 | Strahler | B62B 3/04 | 280/79.11 |
| 2009/0309331 A1 * | 12/2009 | Ryan | B60B 33/0002 | 280/462 |

* cited by examiner

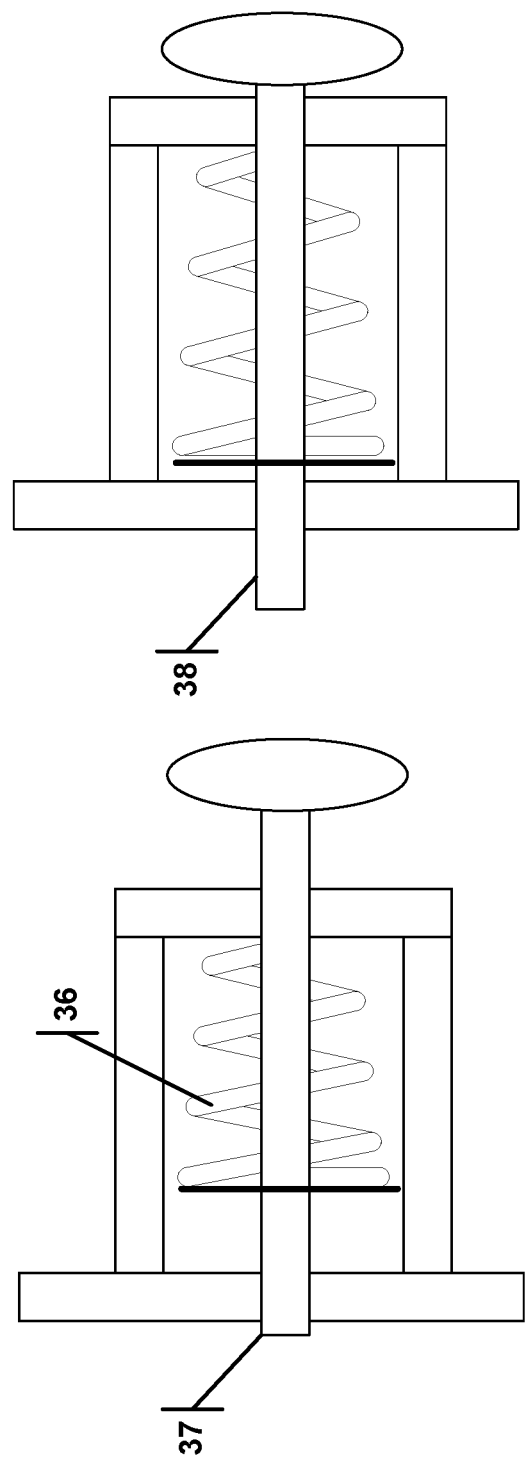

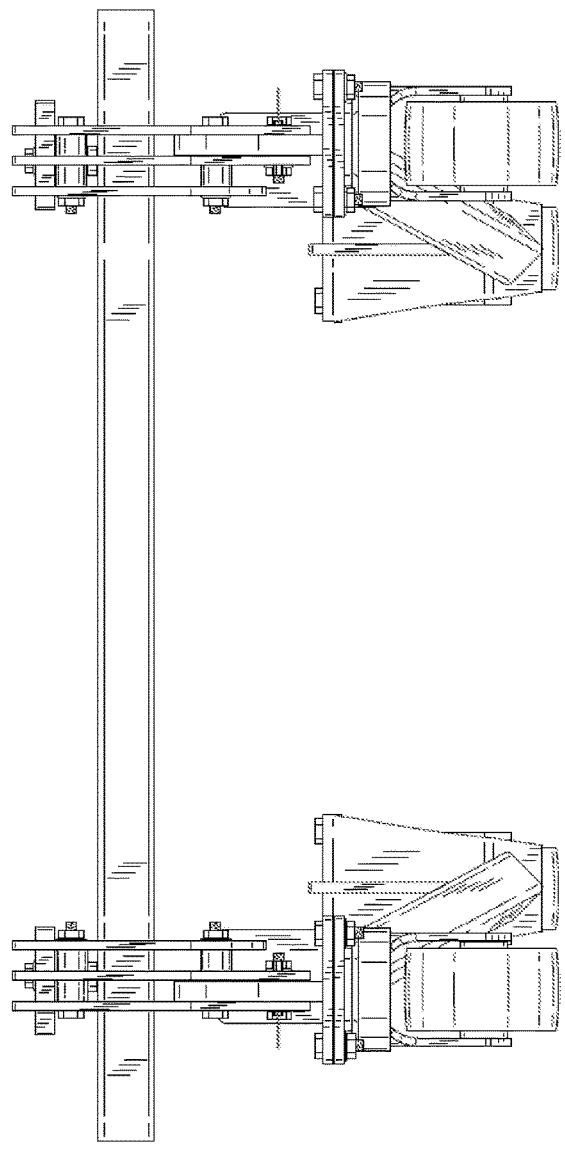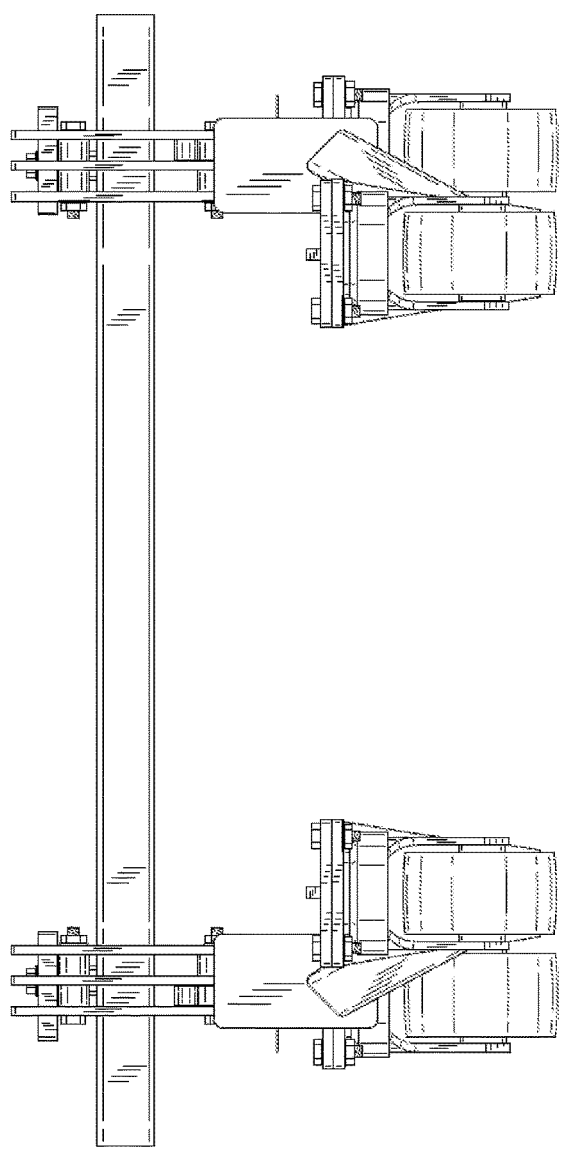

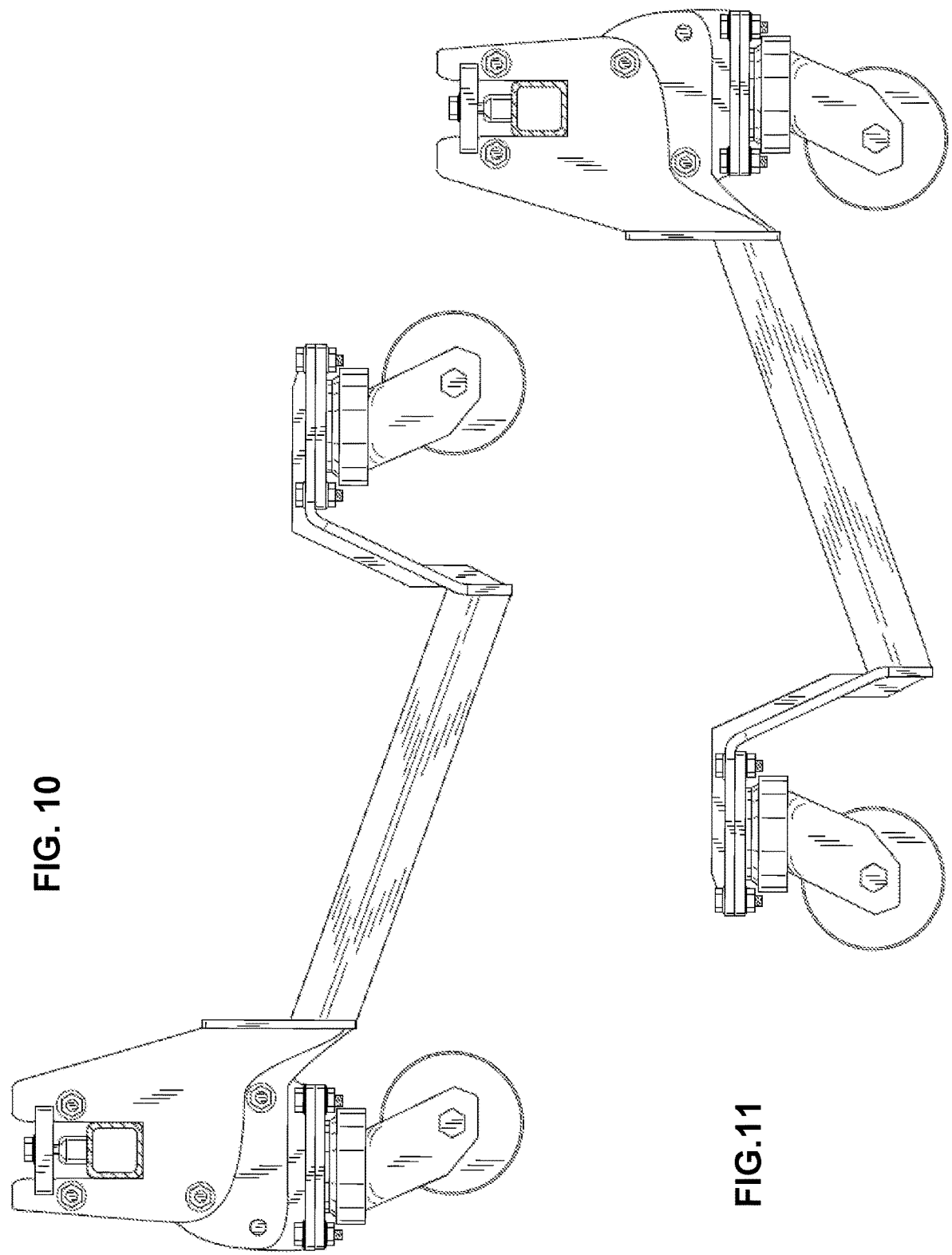

WHEEL DOLLY

1.0 CROSS-REFERENCE TO RELATED APPLICATIONS

This application claims priority to U.S. provisional application 62/843,905, titled Wheel Dolly, filed on May 6, 2019, and also claims priority as a continuation to U.S. design application Ser. No. 29/690,190, titled Wheel Dolly, filed on May 6, 2019. Both of these applications are incorporated herein by reference in their entireties.

2.0 FIELD OF THE INVENTION

This invention relates to tools used to lift vehicle wheels.

3.0 BACKGROUND

Current state-of-the-art wheel dollies require their own hydraulic lift mechanism to ultimately raise the wheel from the floor. For example, U.S. Pat. No. 3,653,527 discloses a wheel dolly with an integrated hydraulic jack used to raise the wheel. Likewise, U.S. Pat. No. 4,050,597 discloses a similar jack system. The problem with these integrated jack systems is that they are heavy because of the additional weight from the dedicated jack system. They are also expensive for the same reason.

Other wheel dollies use a threaded bolt system to create the lift needed to raise the wheel. For example, U.S. Pat. No. 7,597,524 discloses a parallelogram lift system with a bolt that is turned to raise the wheels. U.S. Pat. No. 7,232,138 teaches a long bolt that, when turned, brings two arms in contact with the wheel, and, as the bolt is further turned, the arms lift the wheel. These systems, too, have shortcomings. It can be very taxing to turn a bolt sufficiently to raise a vehicle that weights several tons. Also, it can be unsafe to require a user to be so close to the wheel dolly with manual tools when lifting. Wheel dollies can fail for a variety of reasons, and a user should not be close to the dolly when such a failure occurs.

What is therefore needed is a wheel dolly that that overcomes these deficiencies.

4.0 SUMMARY

The present invention provides an elegant solution to the needs described above and offers numerous additional benefits and advantages, as will be apparent to persons of skill in the art. In particular, the wheel dolly disclosed herein does not include an integrated hydraulic lift; instead, it uses a common vehicle floor jack that users would likely already have. Also, while lifting the vehicle wheel, the user is at a safe distance away and operating the vehicle floor jack, such that, should there be a failure, the user would be at a safer distance relative to the existing prior art.

The wheel dolly disclosed and claimed herein has at least two wheel straddle bars, each straddle bar having a non-swing caster assembly. A swing caster assembly is connected to each straddle bar. The swing caster assembly includes a stationary frame supporting a swing axle, a swing frame that rotates about the swing axle, and a swing caster connected to the swing frame. The swing caster defines a swivel plane. A lift bar connects the two wheel straddle bars. The dolly can transition between two configurations: a lowered configuration, wherein the swivel plane is not parallel to the floor, and a raised configuration, wherein the swivel plane is substantially parallel to the floor.

The lift bar may be constructed to allow each straddle bar to slide along the lift bar independently of each other. The lift bar may have a lift bar locking plate and a bolt for each straddle bar, which may be used to lock the position of each straddle bar relative to the lift bar. Loosening the lift bar locking bolt allows the straddle bar to slide along the lift bar, and tightening the locking bolt fixes the position of the straddle bar relative to the lift bar. The straddle bars are also detachable from the lift bar.

The lift bar is constructed to contact a vehicle floor jack, which may impart a lifting force on the lifting bar, allowing the wheel dolly to transition from the lowered configuration to the raised configuration. When lifted, the swing frame may rotate about the swing axle due to the force of gravity, thereby transitioning the wheel dolly to the raised configuration.

The stationary frame may be made of at least two parallel plates, which can reduce weight and reduce manufacturing costs.

The non-swing caster assembly may be at one end of the straddle bar, and the swing caster assembly may be at the other end. In between both ends, a portion of the straddle bar is constructed to contact the vehicle wheel. The portion of the straddle bar may become less parallel to the ground as the wheel dolly transitions from the lowered to the raised configuration.

The wheel dolly may also have a locking pin that prevents the rotation of the swing frame relative to the stationary frame, locking the wheel dolly in the raised configuration and/or the lowered configuration. The locking pin may be spring-loaded, and may automatically lock the wheel dolly.

The swing frame and swing caster are detachable from the swing caster assembly when the wheel dolly is in the lowered configuration.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 2C illustrates a spring-loaded locking pin that is in the unlocked position.

FIG. 2D illustrates a spring-loaded locking pin that is in the locked position.

Figure 3A:
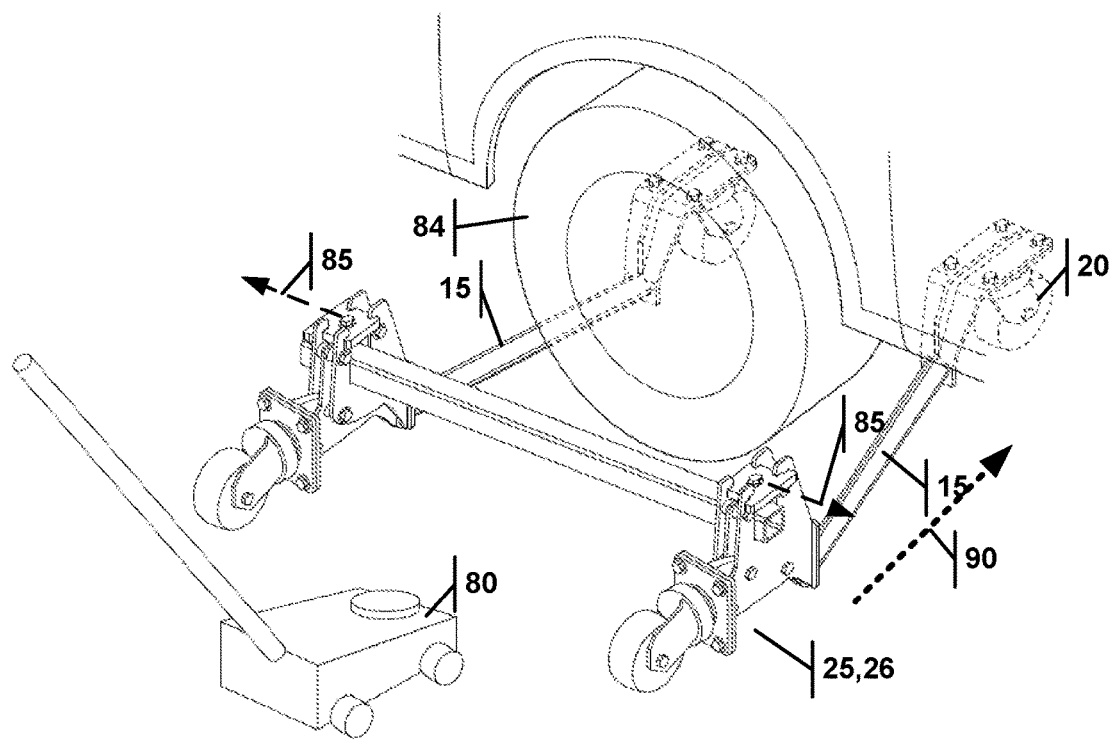
FIG. 3A illustrates the wheel dolly in a lowered configuration and the separation of the straddle bars along the lift bar to clear the width of the wheel.
Figure 3A:
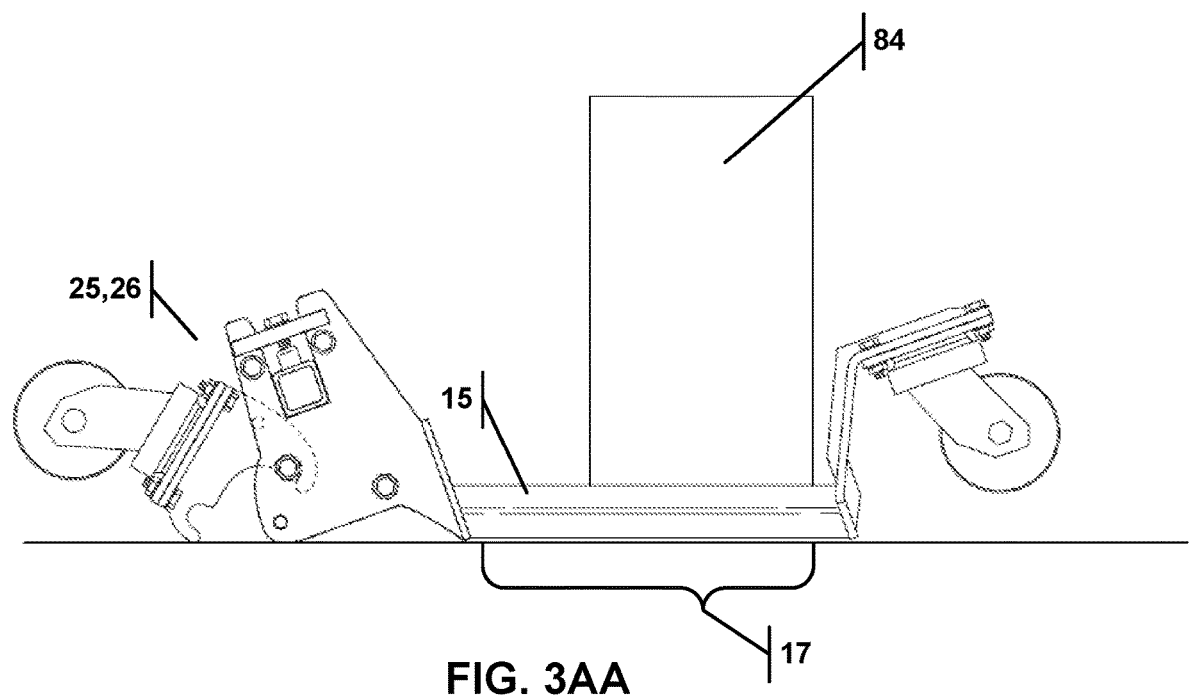

FIG. 3AA is a side view of the wheel dolly relative to the wheel in the configuration shown in FIG. 3A.

Figure 3B:
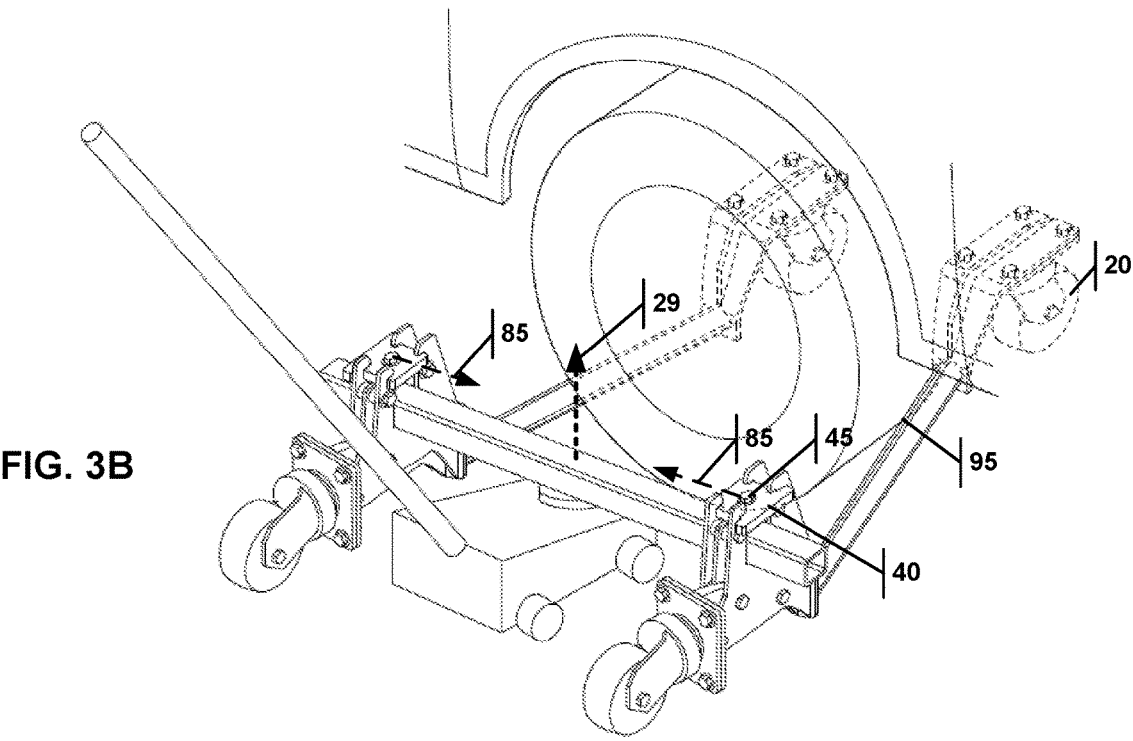
Figure 3B:
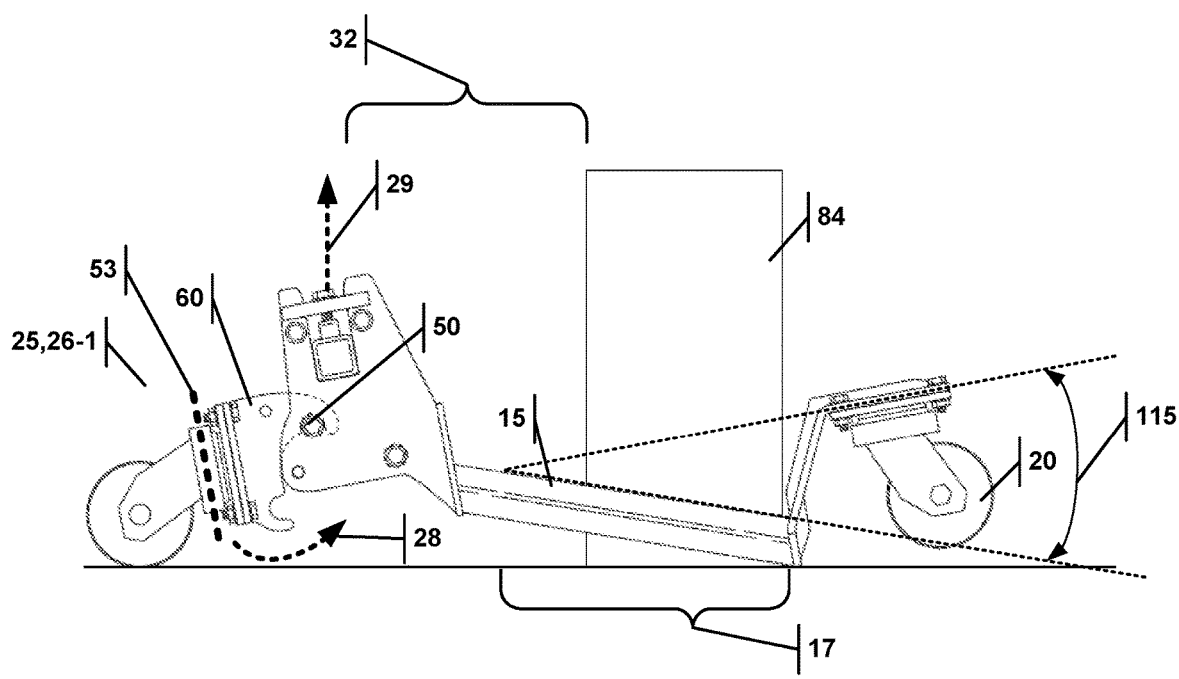

FIG. 3B illustrates the wheel dolly just as the vehicle floor jack has begun applying a lifting force on the lift bar.

FIG. 3BB is a side view of the wheel dolly relative to the wheel in the configuration shown in FIG. 3B.

Figure 3C:
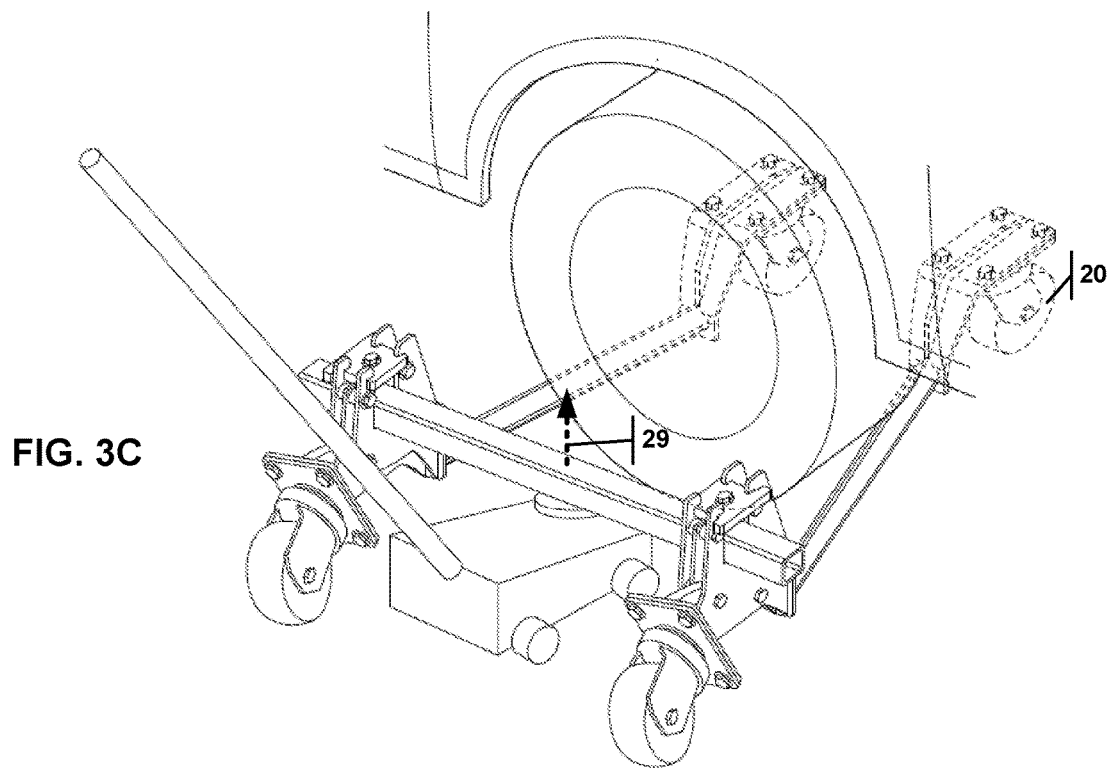
Figure 3C:
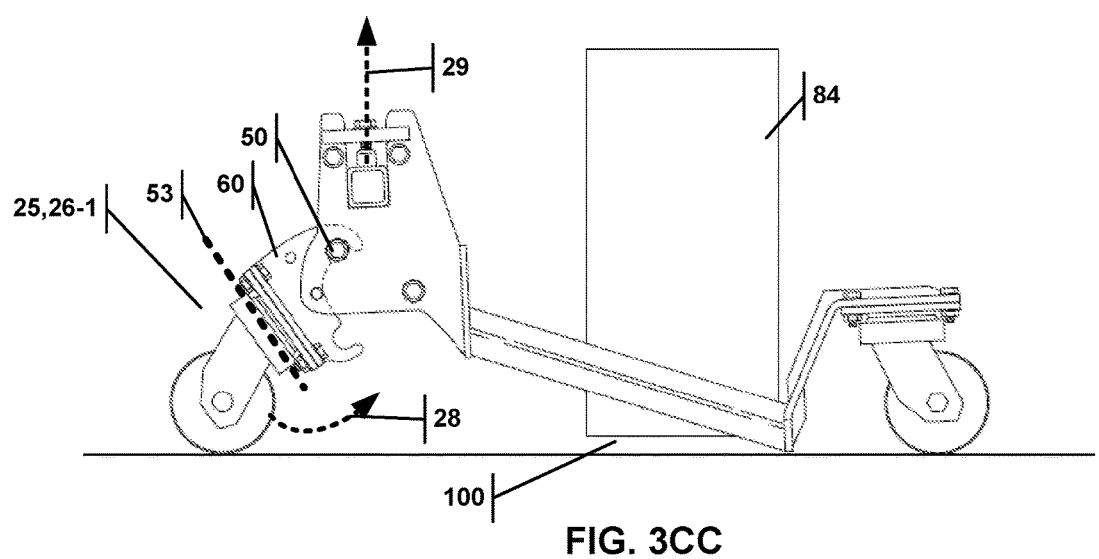

FIG. 3C illustrates the wheel dolly being lifted further than in FIG. 3B.

FIG. 3CC is a side view of the wheel dolly relative to the wheel in the configuration shown in FIG. 3C.

Figure 3D:
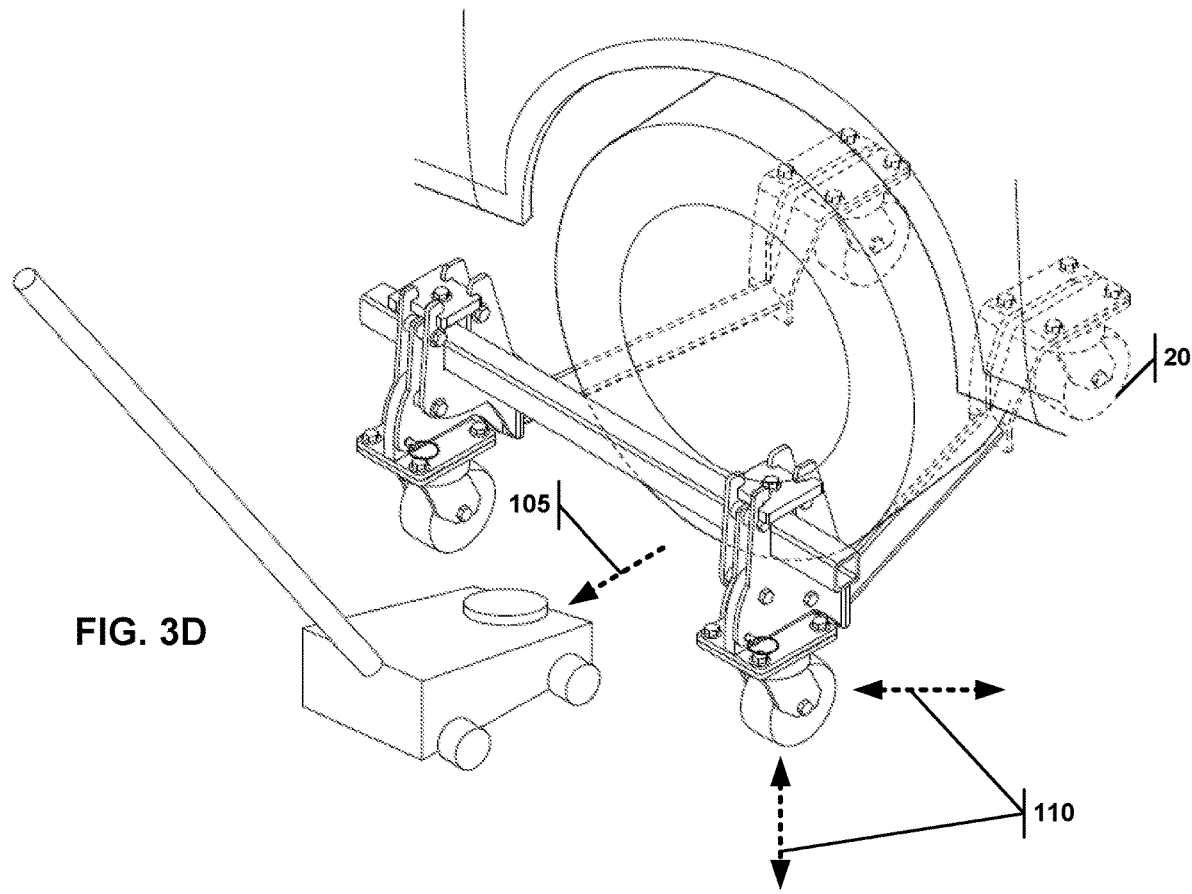
Figure 3D:
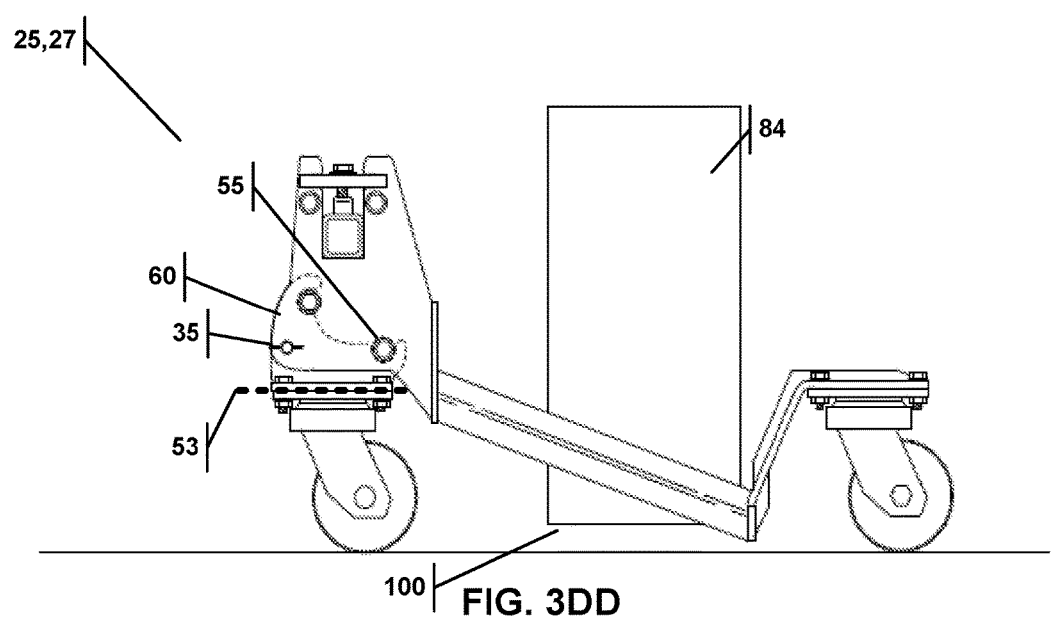

FIG. 3D illustrates the wheel dolly in the raised configuration, such that the wheel is lifted off the ground.

FIG. 3DD is a side view of the wheel dolly relative to the wheel in the configuration shown in FIG. 3D.

Figure 4:
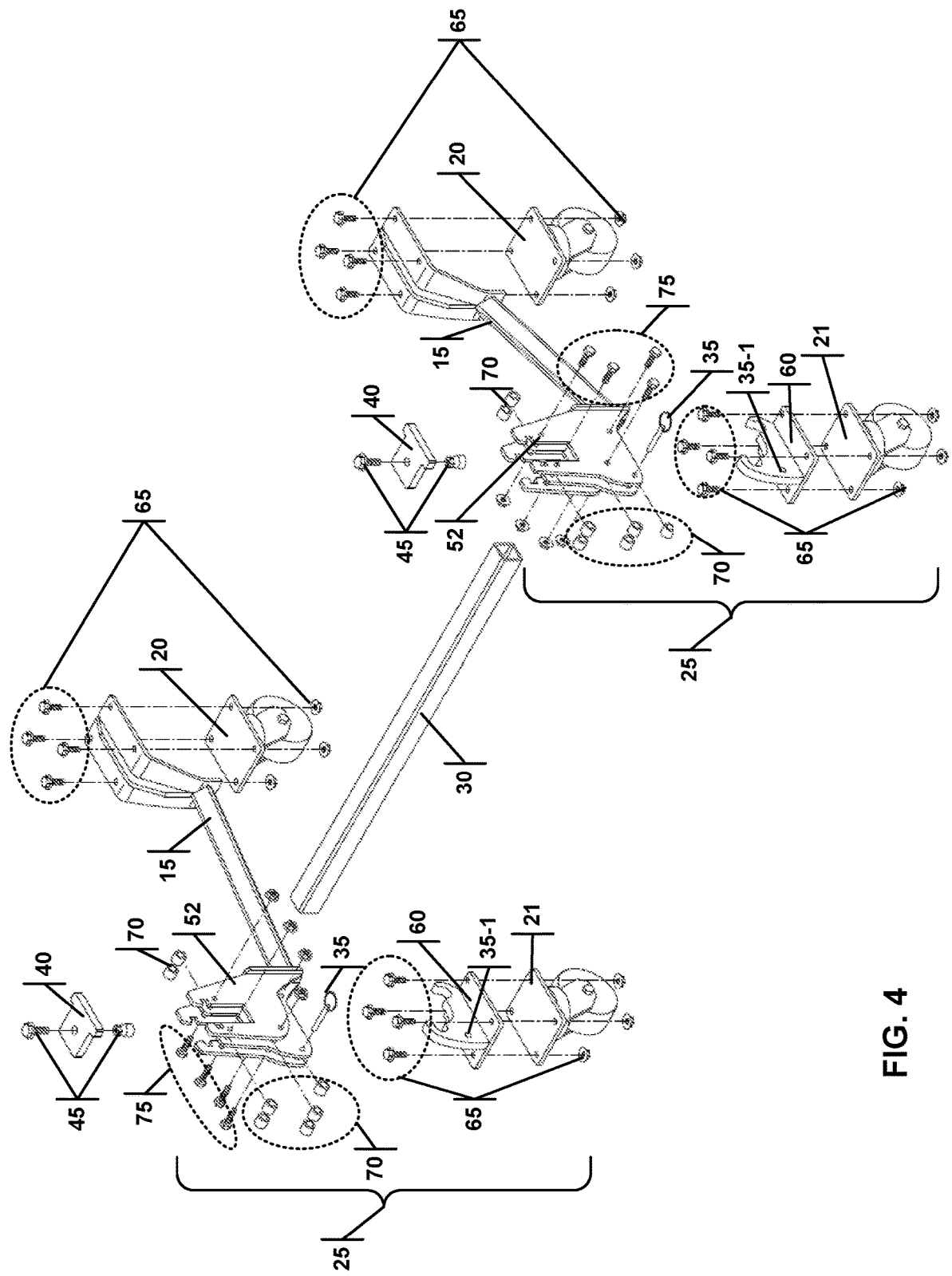

FIG. 4 is an exploded view of the wheel dolly.

Figure 5:
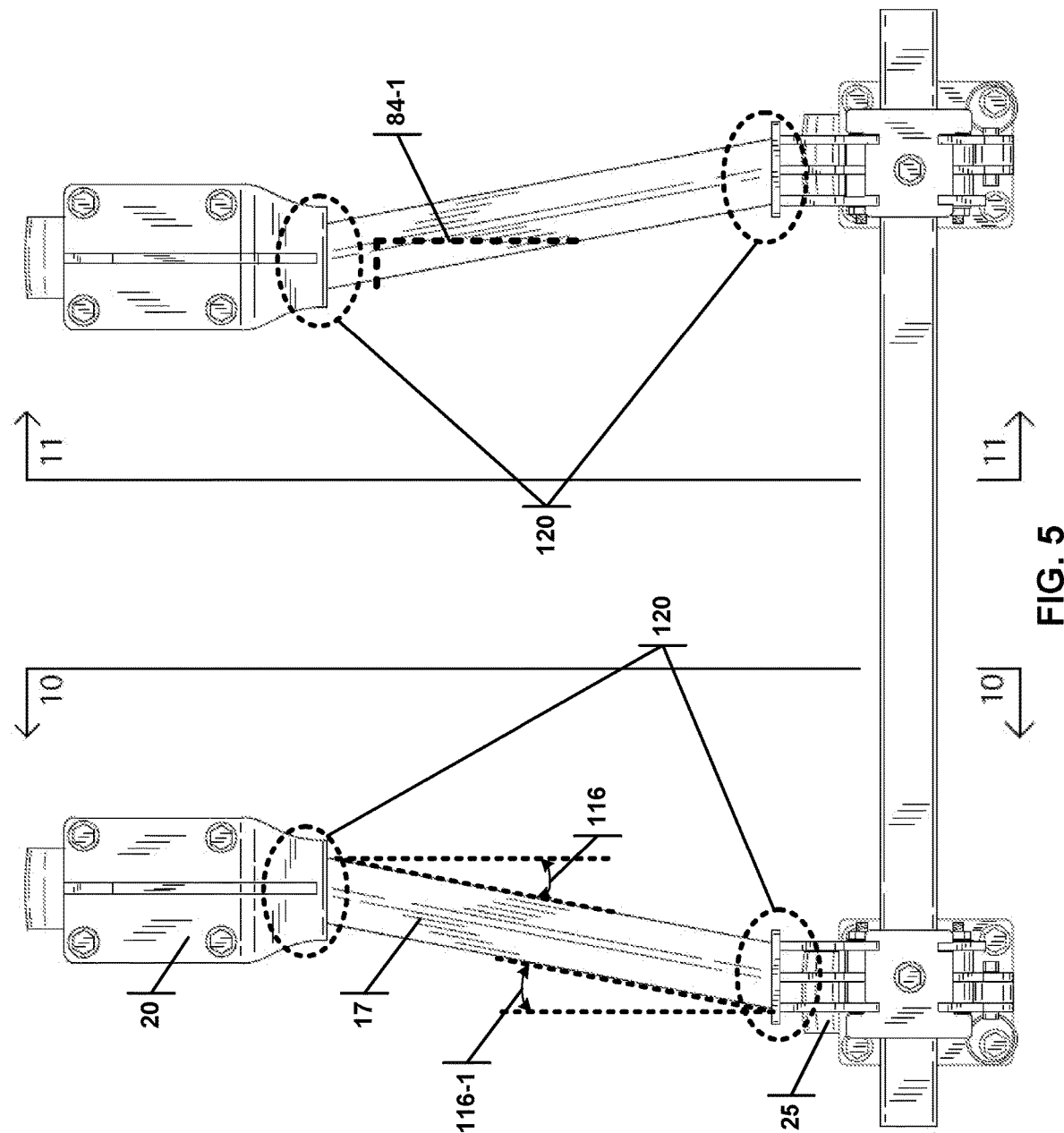

FIG. 5 is a top view of the wheel dolly in the raised configuration.

Figures 6, 7:
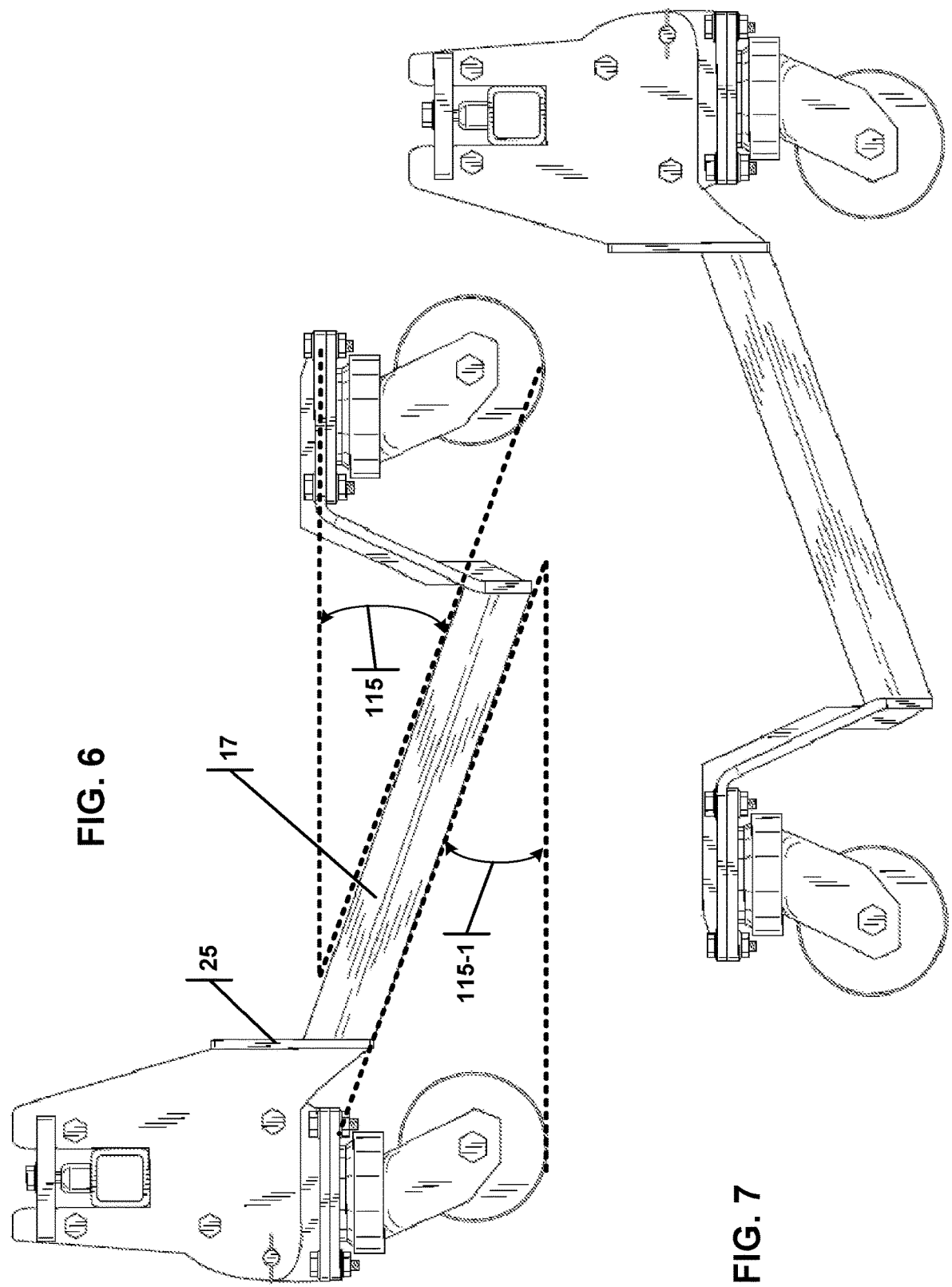

FIG. 6 is a right-side view of the wheel dolly in the raised configuration.

FIG. 7 is a left-side view of the wheel dolly in the raised configuration.

FIG. 8 is a front view of the wheel dolly in the raised configuration.

FIG. 9 is a rear view of the wheel dolly in the raised configuration.

FIG. 10 is an inside section view thereof, taken along the line shown in FIG. 5.

FIG. 11 is an inside section view thereof, taken along the line shown in FIG. 5.

6.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described.

Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

Wheel Dolly 10
Wheel Straddle Bars 15
Portion of Straddle Bar Designed to Contact Wheel 17
Non-swing Caster Assembly 20
Swing Casters 21
Swing Casters Assembly 25
Lowered Configuration 26
Intermediate Configuration 26-1
Raised Configuration 27
Rotation of Swing Caster 28
Lifting Force 29
Lift Bar 30
Lift Bar Setback 32
Locking Pin 35
Locking Pin Hole 35-1
Locking Pin Spring 36
Locking Pin Unlocked Position 37
Locking Pin Locked Position 38
Lift Bar Locking Plate 40
Lift Bar Locking Bolt with a Leveling Mount 45
Swing Axle 50
Stationary Frame 52
Swivel Plane 53
Swing Stop 55
Swing Frame 60
Three-Plate Stationary Frame 62
Torsional Force on Stationary Frame 64
Caster Bolts/Nuts 65
Bushings 70
Swing Casters Assembly Bolts/Nuts 75
Floor-Jack 80
Wheel 84
Slide Direction of Wheel Straddle Bars 85
Movement of Wheel Dolly Under Vehicle 90
Snug Position of Wheel Straddle Bars 95
Ground Clearance 100
Removal of Floor Jack 105
Possible Movement of Wheel Dolly in Raised Position 110
Fixed Angle of Non-Swing Caster Assembly to Straddle Bar (Side View) 115
Fixed Angle of Swing Caster Assembly to Straddle Bar (Side View) 115-1
Fixed Angle of Non-Swing Caster Assembly to Straddle Bar (Top View) 116
Fixed Angle of Swing Caster Assembly to Straddle Bar (Top View) 116-1

Figure 1A:
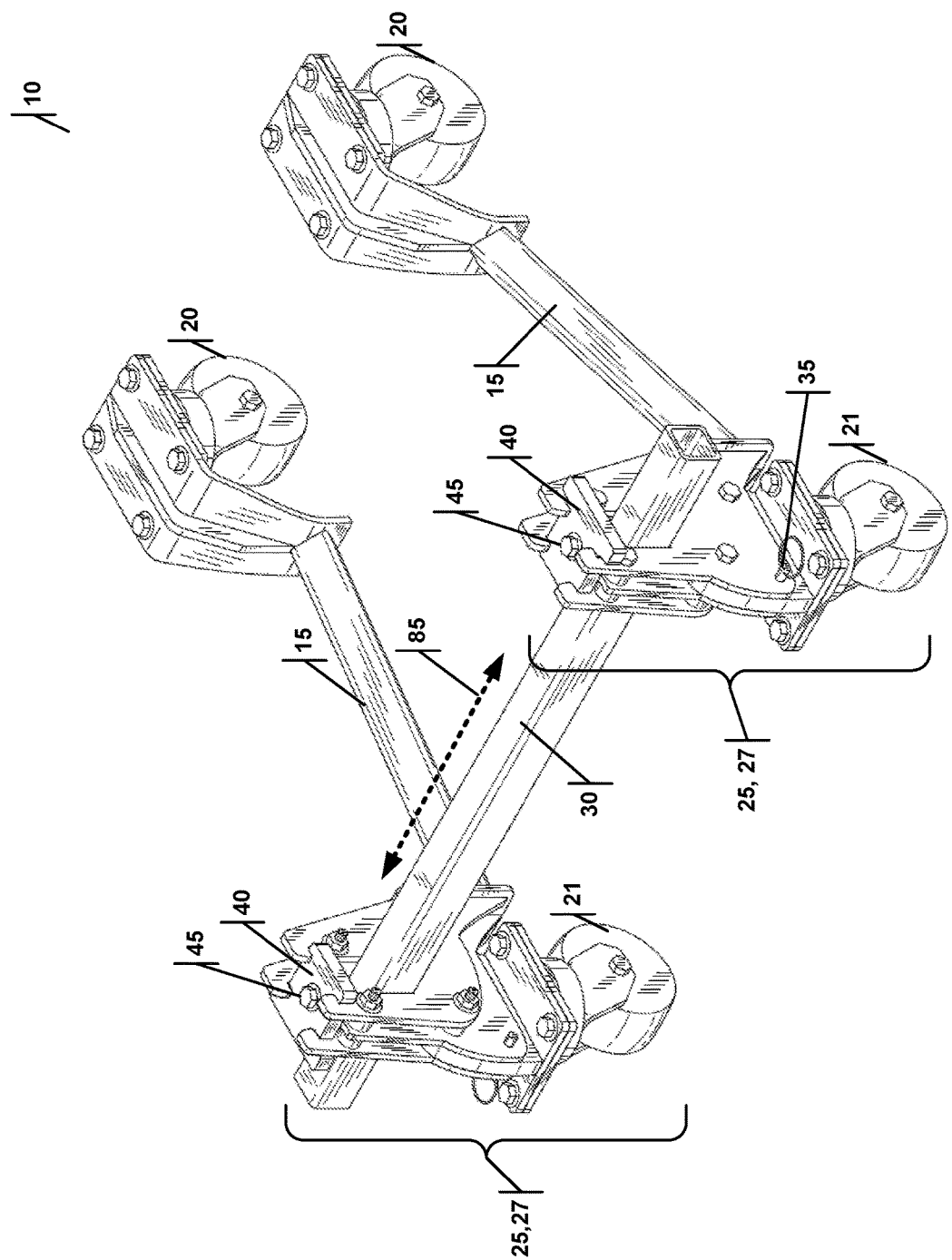
FIG. 1A is a top perspective view of a novel wheel dolly in the raised configuration.
Figure 1B:
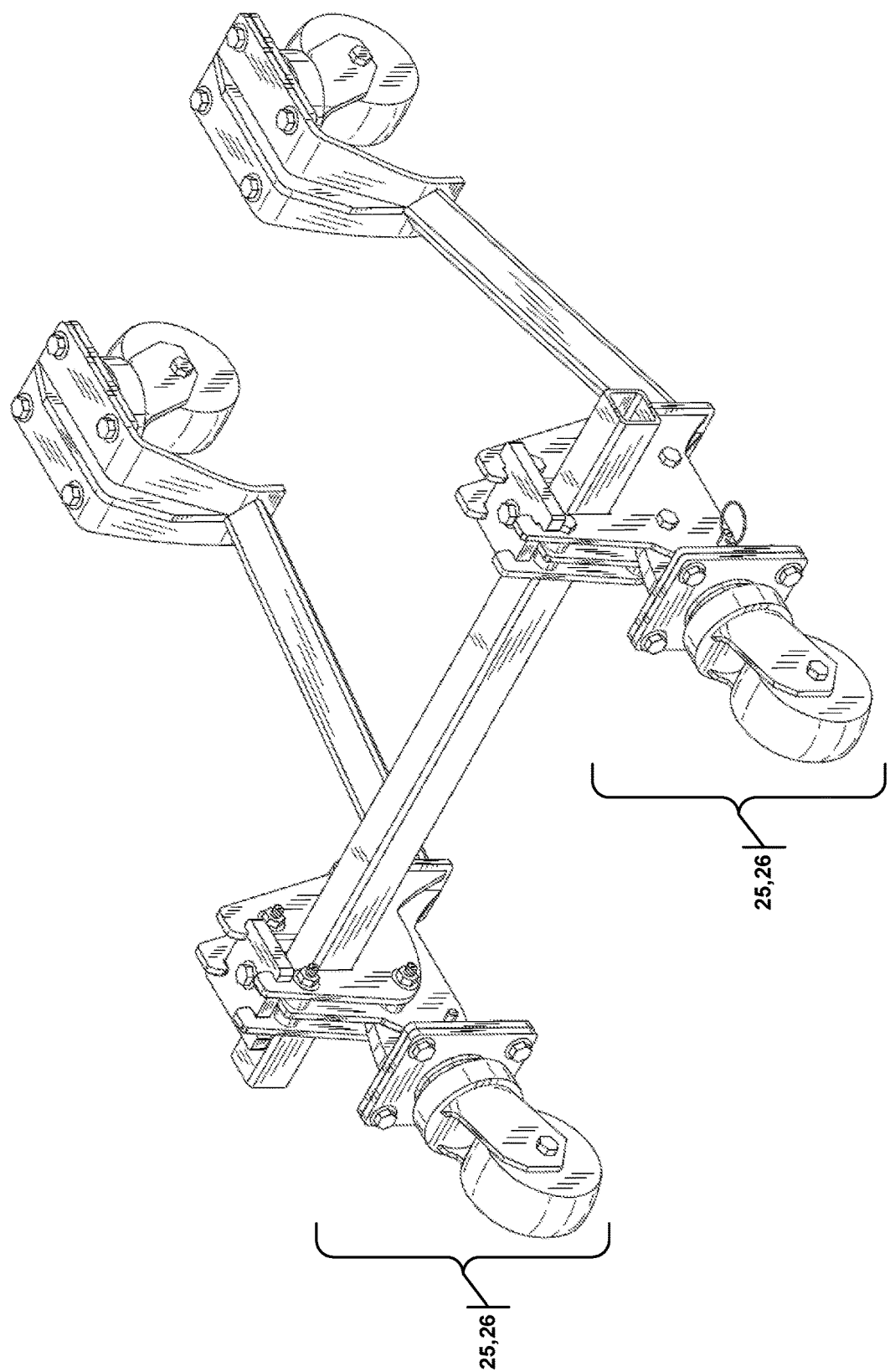
FIG. 1B is a top perspective view of the wheel dolly in the lowered configuration.

Referring to FIG. 1A, a wheel dolly 10 for raising a vehicle wheel off the floor is shown in the raised configuration 27, while FIG. 1B illustrates the dolly 10 in the lowered configuration 26. The dolly 10 includes at least two wheel straddle bars 15, with each straddle bar having a non-swing caster assembly 20 on the end. On the end opposite the non-swing caster assembly 20 is a swing caster assembly 25 connected to each straddle bar 15. A lift bar 30 connects the two wheel straddle bars 15. The lift bar 30 allows each straddle bar 15 to slide along the lift bar 30 independently of one another, in the direction shown by arrows 85. The straddle bars 15 are separated from each other so that the straddle bars 15 can clear the vehicle wheel and can then be brought back together once cleared. This is shown and discussed in more detail in FIGS. 3A and 3B and the associated text.

The dolly 10 may have a lift bar locking plate 40 and bolt 45 for each straddle bar, which would lock the position of each straddle bar 15 relative to the lift bar 30. As shown, loosening the lift bar locking bolt 45 allows the straddle bar 15 to slide along the lift bar 30, and tightening the locking bolt 45 fixes the position of the straddle bar 15 relative to the lift bar 30. When loosened, the user can completely detach the straddle bar 15 from the lift bar 30. One option is to slide the straddle bars 15 past the end of the lift bar 30, and the other option is to loosen the locking bolt 45 sufficiently such that the locking plate 40 slides away from its locked position and can be completely removed, thereby allowing the lift bar 30 to detach from the straddle bar 15. Detaching the straddle bars 15 from the lift bar 30 allows the dolly 10 to become more compact for storage and transport.

Figure 2A:
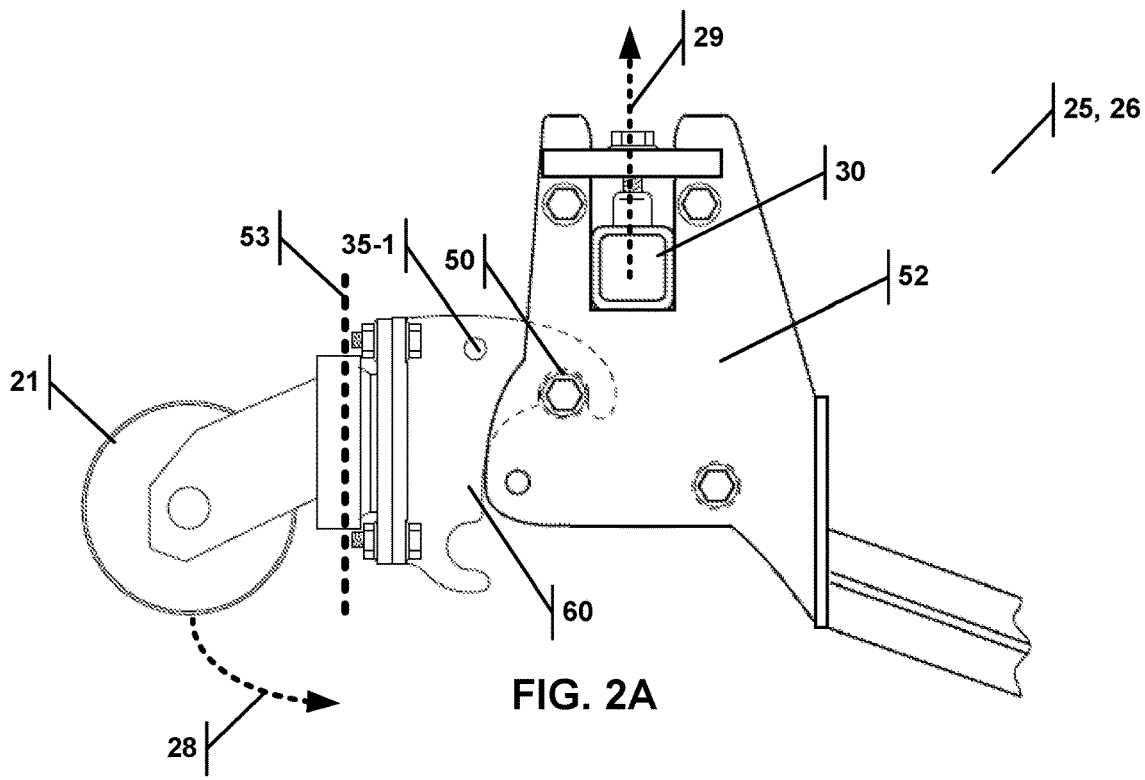
FIG. 2A illustrates the swing caster that is in the lowered configuration.
Figure 2B:
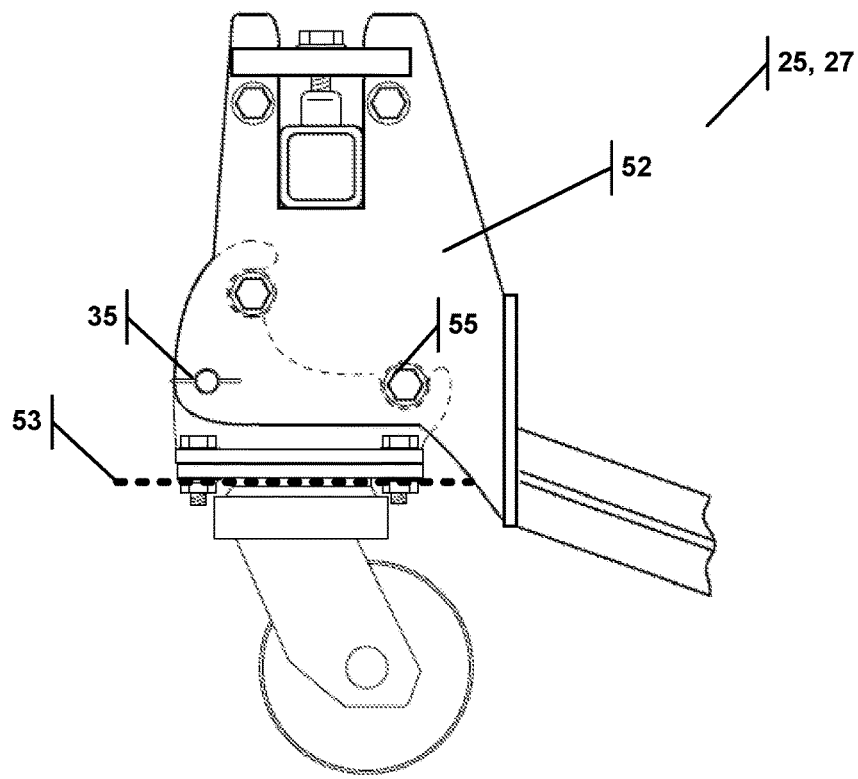
FIG. 2B illustrates the swing caster that is in the raised configuration.

FIGS. 2A and 2B illustrate the swing caster assembly 25 in more detail. The swing caster assembly 25 includes a stationary frame 52 supporting a swing axle 50. A swing frame 60 rotates about the swing axle 50 along the arc shown by arrow 28. A swing caster 21 is connected to the swing frame 60, and the swing caster 21 defines a swivel plane 53 in which the swing caster wheel can swivel. The non-swing caster assemblies 20 may also include swivel casters.

FIG. 2A illustrates the lowered configuration 26 of the dolly, characterized by the condition that the swivel plane 53 is not parallel to the plane of the floor. In this configuration, it is possible to lift the swing frame 60 off of the axle 50, thereby completely separating the swing frame 60 and the swing caster 21 from the swing caster assembly 25. Detaching these components from the swing caster assembly 25 allows the dolly 10 to become more compact for storage and transport.

When a lift force 29 is applied to the lift bar 30, the dolly 10 transitions to the raised configuration 27 shown in FIG. 2B. The lift force 29 is provided by a standard floor jack 80. Specifically, after applying the lift force 29, the swing frame 60 is able to rotate about the swing axle 50, ultimately being stopped by the swing stop 55—thus transitioning the dolly 10 from the lowered configuration 26 to the raised configuration 27. The raised configuration 27 is characterized by the condition that the swivel plane 53 is substantially parallel to the plane of the floor. In operation, the swing frame 60 rotates about the swing axle 50 due to the force of gravity, thereby transitioning the wheel dolly 10 to the raised configuration 27.

To prevent the swing frame 60 from rotating, a locking pin 35 may be used. This provides greater safety when the wheel dolly 10 is in the raised configuration 27. The locking pin 35 may be disposed of in a corresponding pin hole 35-1 on the swing frame 60. This locking pin 35 may also have a locking pin spring 36 such that it remains in the unlocked position 37 (FIG. 2C) until the pin hole 35-1 passes by, allowing the locking pin spring 36 to drive the locking pin 35 into the pin hole 35-1, thereby placing the locking pin 35 in the locked position 38. In this fashion, the spring-loaded locking pin 35 automatically locks the wheel dolly 10. To release the spring-loaded locking pin 35, the user simply pulls on the locking pin 35. Altering the placement of the pin hole 35-1, or, as a non-limiting example, adding a second pin hole, would allow the dolly 10 to be locked in the lowered configuration 26 and/or the raised configuration 27.

Figures 2E, 2F:
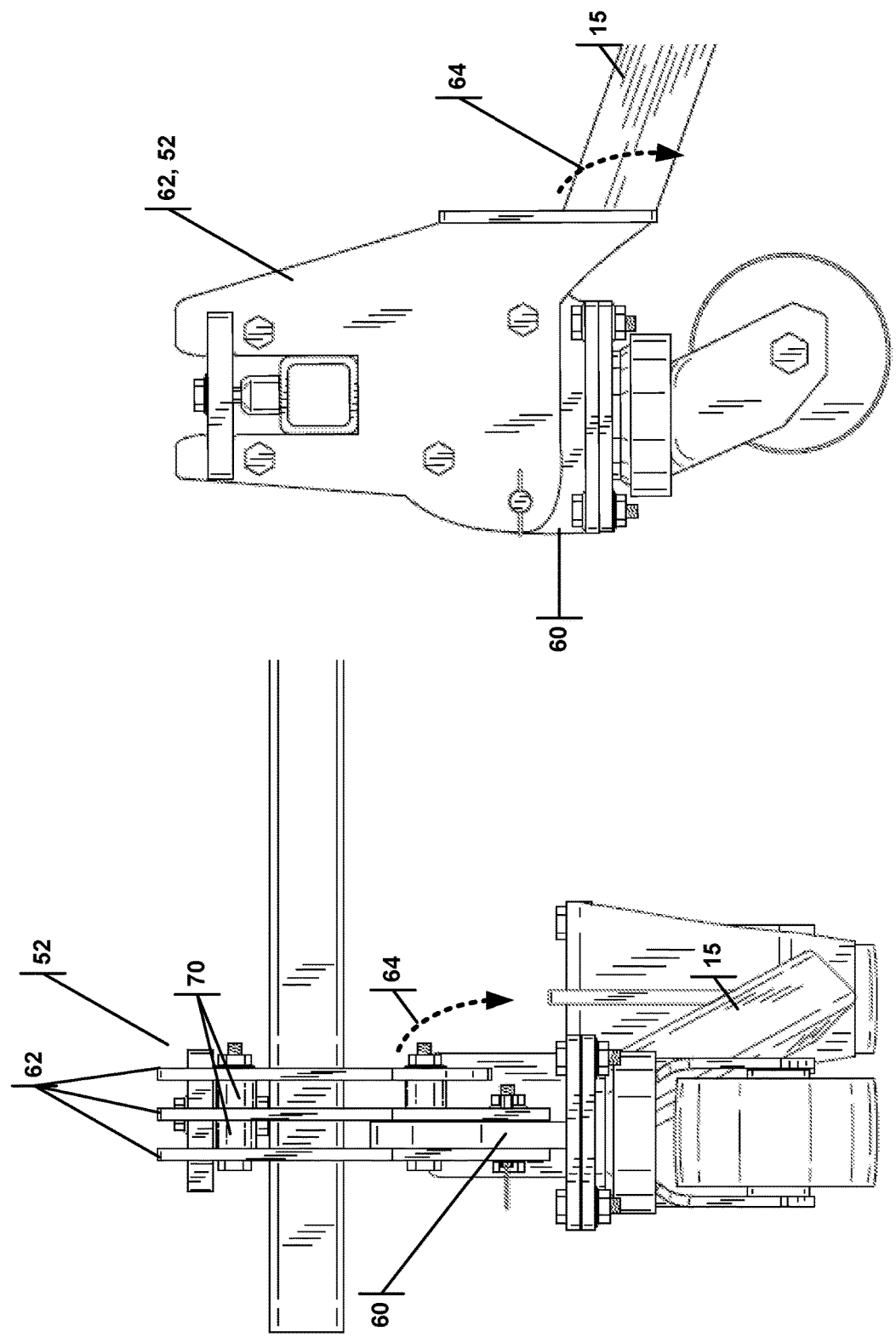
FIG. 2E is a front view of portion of the wheel dolly.
FIG. 2F is a side view of a portion of the wheel dolly.

The stationary frame 52 may be made of two or more parallel plates, as shown in FIGS. 2E and 2F. The multiple plate construction adds strength, while reducing the weight and material costs of manufacturing. The strength of one plate may be doubled when a second plate is mounted next to it, and tripled if three plates are mounted together. The same holds true for plates side by side with bushings 70 in between them. In fact, to obtain the same level of strength as a two-plate configuration in a three-plate configuration, the metal thickness of the plates can be reduced by 33%. In metal fabrication, thinner metal is easier and more cost effective to work with than thicker metal. The best example of this is the most expense process in metal fabrication which is cutting metal. The throughput of cutting ½" metal is 25 inches per minute, while for ³⁄₁₆" it is 90 inches per minute. There is a 4 to 1 cost factor between machine and labor cost, so minimizing metal cutting time is a strategic advantage. By moving from a thicker metal to thinner metal, the preferred embodiment effectively increases strength and reduces cost. Thus, in a preferred embodiment, the stationary frame 52 is made of three plates 62 separated by approximately one-inch bushings 70. The addition of a third, "sandwich" plate allows the torsional force 64 caused by the vehicle wheel load to be more evenly distributed over the stationary frame 52, preventing bending/twisting of the stationary frame 52 under high loads. Not only can such bending/twisting lead to catastrophic failure, it also affects the smooth rotation of the swing frame 60 relative to the stationary frame 52, thereby affecting operation of the dolly.

When the wheel dolly lifts a vehicle wheel, the wheel exerts a torsional force 64 on the straddle bar 15. If the stationary frame were a single plate, it would act like a hinge on a door and would fold under the torsional force 64. Introducing a thicker plate does little to change this torsional "hinge" pressure. But introducing a second plate with a separation between them distributes the load on two opposite sides of these plates and stabilizes the design. The force distributed is a function of the distance between the two plates. If the distance is zero, it would act as a hinge. Torque is a function of force and distance. Given the same torsion, if you double the distance between plates, the force is reduced by a factor two. By adding a third plate and increased in distance between the plates, further increases the ability to handle to torsional force 64. As a practical example, if a two-plate design failed at 2000 lbs, the equivalent three-plate design (same metal weight or 33% thinner metal) would fail at 4000 lbs.

Now focusing on FIGS. 3A-3DD, the operation of the wheel dolly 10 will be discussed. In FIG. 3A, the dolly 10 is in the lowered configuration 26, and the straddle bars 15 are separated from each other in the direction of the arrows 85 to provide clearance to allow the straddle bars 15 to slide past the vehicle wheel 84 and move the dolly 10 under the vehicle, in the direction of arrow 90. As shown in FIG. 3AA, the portion 17 of the straddle bar 15 is designed to contact the wheel 84 and is parallel to the ground.

The straddle bars 15 are then brought together in the direction of arrows 85 (FIG. 3B), and the locking bolts 45 are tightened, fixing the positions of the straddle bars 15 to the lift bar 30. Moving the straddle bars 15 closer to each other bring the portions 17 of each straddle bars 15 in contact with the wheel 84 in a snug position 95, and the floor jack 80 can then begin to lift the dolly 10. FIG. 3BB illustrates that this lift allows the swing frame 60 to begin to rotate (see arrow 28) about the swing axle 50 (and as a consequence the swivel plane 53 also rotates). This figure also illustrates that the portion 17 of the straddle bar 30 is no longer parallel to the ground. FIGS. 3B and 3BB show an intermediate configuration 26-1 between the lowered configuration 26 and the raised configuration 27. FIG. 3BB also illustrates another design feature of the dolly 10, namely the lift bar setback 32. In the preferred embodiment, the lift bar 30 is a square tube bar with a setback 32 of at least four inches to accommodate a standard floor jack, without the jack being obstructed by the vehicle wheel 84.

As the floor jack 80 continues to impart a lifting force 29, the swing frame 60 rotates further (see arrow 28, FIG. 3CC) about the swing axle 50, bringing the swivel plane 53 closer to parallel to the ground. The vehicle wheel 84 now has a ground clearance 100. This figure also illustrates that the portion 17 of the straddle bar 15 is less parallel to the ground than its configuration in FIG. 3BB. FIGS. 3C and 3CC represent another intermediate configuration 26-1 between the lowered and raised configurations.

Finally, in FIGS. 3D and 3DD, the dolly 10 is in the raised configuration 27, defined by the condition of having the swivel plane 53 being substantially parallel to the plane of the floor. Also, the swing frame 60 and the swing caster assembly 25 have been stopped from moving further by the swing stop 55, and the locking pin 35 has been inserted, locking the dolly 10 in the raised configuration 27. The floor jack 80 can be lowered and completely detached from the dolly, shown by arrow 105, after the locking pin 35 is in the locked position 38. The portion 17 of the straddle bar 15 is at its most severe non-parallel orientation relative to the ground (compare FIGS. 3BB, 3CC and 3DD). In the raised configuration 27, the vehicle wheel 84 is completely supported by the dolly 10, with contact being made at the portions 17 of the straddle bars 15, and the vehicle can be moved in various directions 110. It should be noted that the rotation of the swing frame 60 (and consequently the swing caster 21) is done by the force of gravity.

In the lowered configuration 26, the non-swing caster assemblies 20 may be situated at an angle to the portion 17 of the straddle bars 15 and not in contact with the ground (FIGS. 3A-3AA). In an intermediate configuration 26-1, the non-swing caster assemblies 20 may either be off the ground (FIGS. 3B-3BB) or in contact with the ground (FIGS. 3C-3CC), as the dolly 10 transitions toward the raised configuration 27. While the dolly 10 is in the raised configuration 27, the non-swing caster assemblies 20 are in full contact with the ground, supporting the weight of the vehicle wheel 84 in conjunction with the swing casters 21. As the non-swing caster assemblies 20 may be constructed to attach to the straddle bars 15 at a fixed angle 115 to the portion 17 in contact with the vehicle wheel 84, the degree to which the non-swing caster assemblies 20 is in contact with the ground, can vary with the angle that the straddle bar portion 17 makes with the plane of the floor. The fixed angle 115 also illustrates that the swivel plane of the non-swing caster assembly 20 is at an angle to the portion 17 of the straddle bar 15.

FIG. 4 is an exploded view of the various parts of the preferred embodiment. FIGS. 5-11 illustrate various views of the wheel dolly disclosed herein.

As mentioned above with respect to FIG. 3BB, the portion 17 of the straddle bar 30 meets the non-swing caster assembly 20 at an angle 115. As shown in FIG. 6, this angle 115 is the same angle 115-1 that the portion 17 of the straddle bar 30 makes with the swing caster assembly 25. Both these angles (115 and 115-1) are from the side view (i.e., within the plane perpendicular to the ground). From the top view shown in FIG. 5, the portion 17 of the straddle arm 30 also connects to the non-swing caster assembly 20 at an angle 116 that is the same as the angle 116-1 it makes with the swing caster assembly 25. Both these angles (116 and 116-1) are from the top view (i.e., within the plane parallel to the ground). The combination of these angels allows the portion 17 of the straddle bar 30 and non-swing caster assembly 20 to wrap around the wheel for a more secure cradle during lifting. On the left side of FIG. 5 is an outline of the wheel contact position 84-1 on the portion 17 of the straddle bar 30. As shown, the non-swing caster assembly 20 wraps around the back of the wheel, providing a more secure cradle for the wheel.

The cut required to manufacture the compound angles described above is the same for any of the four connection points 120 shown in FIG. 5. Because this is the same compound cut, the dolly can be manufactured more quickly and at less cost because the machinery need not be reconfigured for multiple cuts.

In a preferred embodiment, the lift bar 30 is designed to always allow for a 4" floor jack to be used. Also, the lift bar 30 and the straddle bar 15 bars may be sized as follows:

| Lift Bar Dimensions (in.) | Straddle Bar Dimensions (in.) | Dolly Weight Limit (lbs.) |
|---|---|---|
| 1.5 × 1.5 | 1.5 × 1.5 | 3000 |
| 2.0 × 2.0 | 2.0 × 2.0 | 9000 |
| 2.5 × 2.5 | 2.5 × 2.5 | 18000 |

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A wheel dolly for raising a vehicle wheel off a floor or a horizontal surface by operation of an external jack that provides force in a direction orthogonal to the floor or horizontal surface the dolly comprising:
   at least two wheel straddle bars, each straddle bar having a non-swing caster assembly;
   a swing caster assembly connected to each straddle bar, the swing caster assembly comprising:
      a stationary frame supporting a swing axle;
      a swing frame constructed to rotate about the swing axle; and
      a swing caster connected to the swing frame, the swing caster defining a swivel plane; and
   a lift bar connecting the two wheel straddle bars that is capable of being lifted through contact with the external jack;
   wherein the wheel dolly can transition between two configurations:

a lowered configuration, wherein the swivel plane is not parallel to the floor;

a raised configuration, wherein the swivel plane is substantially parallel to the floor, and a portion of the straddle bars contacts the vehicle wheel;

and wherein the transition between the lowered configuration, and the raised configuration is achieved by the operation of the external jack to raise the lift bar.

2. The wheel dolly of claim 1, wherein the lift bar is capable of allowing each straddle bar to slide along the lift bar independently of one another.

3. The wheel dolly of claim 2, further comprising a lift bar locking plate and a lift bar locking bolt for each straddle bar, the locking plate and bolt capable of locking the position of each straddle bar relative to the lift bar.

4. The wheel dolly of claim 3, wherein loosening the lift bar locking bolt allows the straddle bar to slide along the lift bar, and tightening the lift bar locking bolt fixes the position of the straddle bar relative to the lift bar.

5. The wheel dolly of claim 1, wherein the stationary frame is comprised of at least two parallel plates.

6. The wheel dolly of claim 1, wherein the non-swing caster assembly is at one end of each of the straddle bars, and the swing caster assembly is at the other end, and the portion of each of the straddle bars that is capable of contacting the vehicle wheel is between the two ends of the straddle bar.

7. The wheel dolly of claim 6, wherein the angle that the straddle bar in contact with the vehicle wheel makes relative to the horizontal plane of the floor is increased as the wheel dolly transitions from the lowered configuration to the raised configuration.

8. The wheel dolly of claim 6, wherein the non-swing caster assembly on each straddle bar is connected at a fixed angle relative to the portion of the straddle bar in contact with the vehicle wheel.

9. The wheel dolly of claim 1, further comprising a swing stop on the stationary frame of the swing caster assembly, wherein the swing frame rotates about the swing axle due to the force of gravity until the swing frame rotation is stopped by the swing stop, thereby transitioning the wheel dolly to the raised configuration.

10. The wheel dolly of claim 1, further comprising a locking pin that prevents the rotation of the swing frame relative to the stationary frame.

11. The wheel dolly of claim 10, wherein the locking pin locks the wheel dolly in the raised configuration and/or in the lowered configuration.

12. The wheel dolly of claim 11, wherein the locking pin is spring-loaded.

13. The wheel dolly of claim 12, wherein the locking pin automatically locks the wheel dolly.

14. The wheel dolly of claim 10, further comprising one or more pin holes constructed to receive the locking pin.

15. The wheel dolly of claim 14, wherein the swing frame comprises the one or more pin holes.

16. The wheel dolly of claim 1, wherein the swing frame and the swing caster are detachable without requiring the use of tools from the swing axle when the wheel dolly is in the lowered configuration.

17. The wheel dolly of claim 1, wherein the straddle bars are detachable from the lift bar.

18. The wheel dolly of claim 1, wherein the stationary frame is comprised of at least three parallel plates with spacing in between the plates.

* * * * *